United States Patent
Wilhelm et al.

(10) Patent No.: US 8,127,360 B1
(45) Date of Patent: Feb. 28, 2012

(54) METHOD AND APPARATUS FOR DETECTING LEAKAGE OF SENSITIVE INFORMATION

(75) Inventors: Jeffrey Wilhelm, Los Angeles, CA (US); Carey Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 1087 days.

(21) Appl. No.: 11/477,231

(22) Filed: Jun. 29, 2006

(51) Int. Cl.
*H04L 29/06* (2006.01)

(52) U.S. Cl. .................................................... 726/25

(58) Field of Classification Search ............ 726/11, 726/25, 22; 713/156, 172, 191, 194
See application file for complete search history.

(56) References Cited

U.S. PATENT DOCUMENTS

| | | | | |
|---|---|---|---|---|
| 4,672,572 | A * | 6/1987 | Alsberg | 726/11 |
| 6,185,689 | B1 * | 2/2001 | Todd et al. | 726/25 |
| 7,617,532 | B1 * | 11/2009 | Alexander et al. | 726/22 |
| 2002/0023059 | A1 * | 2/2002 | Bari et al. | 705/76 |
| 2002/0120854 | A1 * | 8/2002 | LeVine et al. | 713/189 |
| 2002/0178271 | A1 * | 11/2002 | Graham et al. | 709/229 |
| 2004/0080772 | A1 * | 4/2004 | Snyders | 358/1.14 |
| 2005/0060537 | A1 * | 3/2005 | Stamos et al. | 713/156 |
| 2005/0193428 | A1 * | 9/2005 | Ring et al. | 726/22 |
| 2005/0273861 | A1 * | 12/2005 | Chess et al. | 726/25 |
| 2006/0277604 | A1 * | 12/2006 | Pandit et al. | 726/22 |
| 2007/0112864 | A1 * | 5/2007 | Ben-Natan | 707/200 |
| 2009/0024675 | A1 * | 1/2009 | Hewitt et al. | 707/204 |

OTHER PUBLICATIONS

Chow, Jim, et al., "Understanding Data Lifetime via Whole System Simulation", *Proceedings of the 13th USENIX Security Symposium* (Aug. 2004).

Newsome, James, et al., "Dynamic Taint Analysis for Automatic Detection, Analysis, and Signature Generation of Exploits on Commodity Software", *Proceedings of the 12th Annual NDSS* (Feb. 2005).

* cited by examiner

*Primary Examiner* — Hadi Armouche
(74) *Attorney, Agent, or Firm* — Wilmer Cutler Pickering Hale and Dorr LLP

(57) ABSTRACT

A method and apparatus for preventing leakage of sensitive information from a computer is described. The method includes identifying data entered into the computer system as sensitive data, tainting the sensitive data with at least one taint bit to form a tainted data, tracking the tainted data within the computer system and identifying at least one condition that compromises the security of the tainted data. The system is a computer system including taint analysis software for identifying data entered into the computer system as sensitive data, tainting the sensitive data with at least one taint bit to form a tainted data, tracking the tainted data within the computer system and identifying at least one condition that compromises the security of the tainted data.

21 Claims, 2 Drawing Sheets

METHOD AND APPARATUS FOR DETECTING LEAKAGE OF SENSITIVE INFORMATION

BACKGROUND OF THE INVENTION

1. Field of the Invention

Embodiments of the present invention generally relate to detecting data leakage, and, more particularly, to a method and apparatus that uses data tracking to detect data leakage.

2. Description of the Related Art

Information theft is a growing problem that costs consumers and businesses millions of dollars per year. Information theft includes identity theft, i.e., the use of another person's name and information associated with that name in an unauthorized manner. Associated information may include the person's social security number, credit card information, driver's license information, address information, and the like. Information theft also encompasses theft of computer information, such as user's login name and password. Theft of such computer information often leads to identity theft, or to theft of other important information such as sensitive text files, email messages, instant messaging communications, or database files.

The perpetrators of information theft have created a new class of computer software known as "crimeware". Crimeware is software that has no legitimate or legal purpose. Crimeware is purposely designed to intercept sensitive information entered into a computer by a user and transmit the information to an unauthorized recipient. Crimeware applications include key loggers and trojan viruses designed specifically for this purpose. The crimeware application is capable of recording the user's keystrokes, storing the recorded information, and then transmitting the recorded information to the unauthorized recipient. Simple crimeware applications may take control of the user's email client and mail the recorded information to the unauthorized recipient. Other more sophisticated crimeware applications may transmit the recorded information through a dedicated network connection on the user's computer. Other crimeware applications may have their own mail server or ftp program built-in so they can transmit the recorded information from any user's machine connected to a network. The varieties and types of crimeware applications are endless.

Currently, crimeware applications are detected in the same way a virus program is detected. Anti-crimeware software, which is also typically anti-virus software, scans the crimeware application file and compares its contents against a set of signatures for known crimeware applications. If the generated signature matches a signature in the known group of signatures, then the crimeware application is detected and the anti-crimeware software can initiate an appropriate action. The appropriate action may include deleting the crimeware application, quarantining the crimeware application or prompting the user to the presence of the crimeware application.

The current solution requires the anti-crimeware software to be updated with new signatures for each crimeware application in existence. In other words, if the anti-crimeware software does not include a signature for a particular crimeware application, the anti-crimeware software will not be able to detect or identify that particular crimeware application.

Thus, there is a need in the art for anti-crimeware software capable of detecting a crimeware application for which the anti-crimeware software does not have a signature. The anti-crimeware software should also be capable of substantially preventing leakage of sensitive information from a computer to an unauthorized recipient of the sensitive information.

SUMMARY OF THE INVENTION

The present invention generally relates to detecting data leakage and, more particularly, to a method and apparatus that substantially prevents leakage of sensitive information from a computer. The method comprises identifying data entered into the computer system as sensitive data, tracking the sensitive data within the computer system, and identifying at least one condition that compromises the security of the sensitive data. The system comprises a computer system comprising taint analysis software for identifying data entered into the computer system as sensitive data, tracking the sensitive data within the computer system, and identifying at least one condition that compromises the security of the sensitive data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
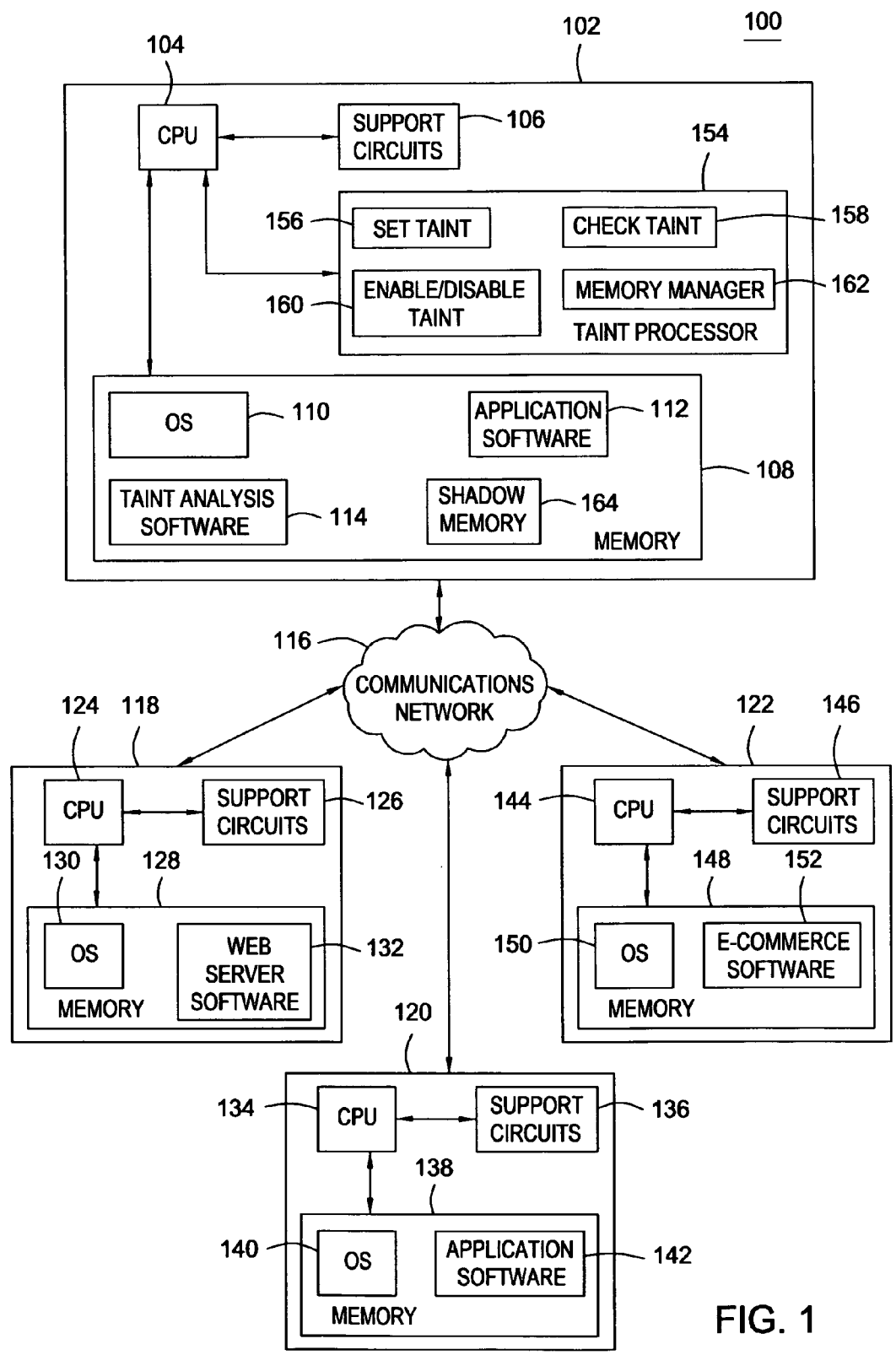
FIG. 1 is a computing environment in which the present invention can be utilized.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The present invention generally relates to preventing information theft from a computer system and, more particularly, a method and apparatus that substantially prevents leakage of sensitive information from a computer system. The method comprises identifying data entered into the computer system as sensitive data, tracking the sensitive data as it is copied or moved around in the memory of the computer system and identifying at least one condition that compromises the security of the sensitive data.

In one embodiment of the invention, tracking of sensitive data within a computer system can be accomplished using a well-known technique known as taint analysis. Taint analysis is a technique that can be used to track all instances of a specific set of data and subsequent copies or transformations of the data on a computer system. One embodiment of the invention employs taint analysis techniques to (a) classify certain types of data entered into the computer system as sensitive data, e.g., credit card numbers, (b) tag the said data within the computer system's memory as sensitive using a tainting technique, and then propagating this sensitive data tag to all copies and transformations of the data, and finally (c) identify at least one condition that compromises the security of any instance of transformation of the tagged data.

The present invention prevents leakage of sensitive information from a computer system by leveraging the taint analysis technique. The goal of a taint analysis system is to track the flow of a data item through a program or operating system in order to identify copies or transformed versions of the data item. For instance, the user might type a keyword into a field of an application and the application might encrypt the keyword and store the keyword in another part of memory. The application may also compute a hash of the keyword and store the hash elsewhere in memory. Finally, the application may store the keyword to a disk file and another application might read the keyword from the disk file into memory for processing. A taint analysis system could track every instance of the keyword, in any memory subsystem of the computer (both in memory and on disk) in any of its forms, including un-encoded, encrypted or hashed forms. This tracking can be accomplished in a number of ways. One common way is to add a shadow bit-array to the computer's memory, storing one bit to track each byte of information in the computer system. Each bit may have a value of zero (indicating the memory cell doesn't have critical data that requires tracking) unless a specific range of data bytes have been tagged as tainted, in which case, the value of the bit or bits for that region of data will be set to 1. Each time such a tainted memory location is accessed and the data moved to a CPU register, the register can be tainted also, and if the tainted data is finally written back to memory from the register, the target memory will also automatically be tainted. This tainting process can be accomplished by integrating taint support directly into the hardware using a taint processor, or by injecting instrumentation into a program's machine language (or source code) to automatically propagate taint information.

In order for taint analysis to take place, the software must first identify the set of data that needs to be tracked. Once the data has been identified and the taint bits have been set for the memory location containing the data that needs to be tracked, the computer system can track the flow of tainted data.

FIG. 1 is an example of a computing environment 100 in which the present invention can be utilized. The computing environment 100 comprises a client computer 102 connected by a communications network 116 to a secure web server 118, an application server 120 and an e-commerce server 122. The communications network 116 may be any conventional network such as Internet, fibre channel, Ethernet, or any network that allows the client computer 102 to communicate with another computing device, such as the secure web server 118, the application server 120 and the e-commerce server 122. The present invention can function in a variety of computing environments. One skilled in the art will appreciate that computing environment 100 does not necessarily require the secure web server 118, the application server 120 and the e-commerce server 122 for the present invention to function.

The client computer 102 is any computing device such as a personal computer, laptop computer, tablet computer, personal digital assistant (PDA), etc. The client computer 102 comprises a central processing unit (CPU) 104, support circuits 106, a memory 108 and optionally a taint processor 154. The CPU 104 may comprise one or more commercially available microprocessors. The support circuits 106 are well known circuits that comprise power supplies, clocks, input/output interface circuitry and the like.

The taint processor 154 is an integrated circuit that enables the computer system 102 to perform taint analysis functions in hardware. The taint processor 154 is shown as a standalone circuit. However, the taint processor 154 may have been shown as part of the support circuits 106 or as part of the CPU 104.

The taint processor 154 comprises an enable/disable taint logic 160, a set taint logic 156, a check taint logic 158 and a memory manager logic 162. The enable/disable taint logic 160 enables and disables the taint checking functionality of the taint processor 154. When the enable/disable taint logic 160 is set to enable, the taint processor 154 can interact with software such as the taint analysis software 114 to taint sensitive data. The set taint logic 156 is responsible for tainting data within a shadow memory 164 location in the memory 108 and the memory manager logic 162 is responsible for the management of the shadow memory 164 location in the memory 108. The check taint logic 158 checks data within the shadow memory 164 location to determine if the data is tainted or untainted. The check taint logic 158 provides a taint status, i.e., an indication data located within the shadow memory 164 is tainted or untainted, to the taint analysis software 114.

The taint processor 154 is an optional component of the computer system 102. The most currently available computer systems may include the taint processor 154. The taint analysis software 114 utilizes the taint processor 154 to perform taint analysis functions at a more efficient rate than computer systems that do not have the taint processor 154. Older generations of computer systems do not include the taint processor 154. The taint analysis software 114 can still function on these older generation computer systems, but the taint analysis software 114 must perform such functions as memory management. Memory management functions are more readily performed by the taint processor 154. Thus, the presence of the taint processor 154 increases the computational efficiency of the computer system 102.

If the taint processor 154 is present within the computer system 102, the taint analysis software 114 will detect the presence of the taint processor 154 via the operating system 110. The taint analysis software 114 will then take advantage of the presence of the taint processor 154, offloading such functions as tainting data and management of shadow memory 164 locations onto the taint processor 154. If a taint processor 154 is not present, then the taint analysis software 114 performs all of the taint analysis functions as described below. Thus, the taint analysis software 114 provides taint analysis capability to computer systems that do not have a taint processor 154; on computer systems that do have a taint processor 154 the taint analysis software 154 is executed at a faster speed and with a greater reliability.

Memory 108 may comprise random access memory, read only memory, removable disk memory, flash memory, and various combinations of these types of memory. The memory 108 is sometimes referred to as main memory and may in part be used as cache memory or buffer memory. The memory 108 stores various software packages, such as an operating system (OS) 110, application software 112 and taint analysis software 114. The memory 108 also comprises a shadow memory 164. The shadow memory 164 is an area within the memory 108 set aside by the taint analysis software or the taint processor 154 for performing taint analysis functions. A specific address within the shadow memory 164 is known as a shadow memory 164 location.

The application software 112 may include database software, word processing software, electronic mail software, collaborative environment software and any software that can be executed by the client computer 102. The application software 112 may receive or store sensitive information provided by the user of the client computer 102. Sensitive information may also be provided to the application software 112 via the communications network 116.

The taint analysis software 114 is software designed to substantially prevent leakage of sensitive information from the client computer 102 to an unauthorized recipient. The sensitive information may be entered into the client computer 102 by the user, stored by the application software 112, transmitted by the application software 112 to another computing device via the communications network, or received by the application software 112 via the communications network 116.

The secure web server 118 is any web server that provides web (html) pages to the client computer 102 in a secure manner. The secure web server comprises a CPU 124, support circuits 126, and a memory 128. The CPU 124 may comprise one or more conventionally available microprocessors. The support circuits 126 are well known circuits that comprise power supplies, clocks, input/output interface circuitry and the like.

Memory 128 may comprise random access memory, read only memory, removable disk memory, flash memory, and various combinations of these types of memory. The memory 128 is sometimes referred to as main memory and may in part be used as cache memory or buffer memory. The memory 128 stores various software packages, such as an operating system (OS) 130 and web server software 132.

Secure web pages are typically identified by a web (URL) address that begins with "https" (hypertext transfer protocol secure) indicating the information sent to and from the web address is sent via a secure socket. Secure web servers 118 are generally utilized by banks, financial institutions, e-commerce businesses, and other organizations that send and receive sensitive information via the Internet. Sensitive information provided to the secure web server 118 may include but is not limited to the following: a user name, a password, an account name, credit card information, automatic teller machine (ATM) card information, a bank account number, a routing number, a personal identification number (PIN), and the like.

The application server 120 is any server that allows the client computer 102 to access application software 142. The application server 102 comprises a CPU 134, support circuits 136, and a memory 138. The CPU 134 may comprise one or more conventionally available microprocessors. The support circuits 136 are well known circuits that comprise power supplies, clocks, input/output interface circuitry and the like.

Memory 138 may comprise random access memory, read only memory, removable disk memory, flash memory, and various combinations of these types of memory. The memory 138 is sometimes referred to as main memory and may in part be used as cache memory or buffer memory. The memory 138 stores various software packages, such as an operating system (OS) 140 and application software 142.

The application software 142 may include database software, word processing software, electronic mail software, collaborative environment software, or any software that can be provided by the application server 120 to the client computer 102. The application server 120 generally authenticates the client computer 102 before permitting access to the application software 142. Authentication may be performed by requesting sensitive information such as a user name and password from the client computer 102.

The e-commerce server 122 is any server that allows the user to conduct a business transaction, e.g., the purchasing of goods or services, via the client computer 102. Commercial websites such as AMAZON and EBAY utilize e-commerce servers 122. The e-commerce server 122 comprises a CPU 144, support circuits 146 and a memory 148. The CPU 144 may comprise one or more conventionally available microprocessors. The support circuits 146 are well known circuits that comprise power supplies, clocks, input/output interface circuitry and the like.

Memory 148 may comprise random access memory, read only memory, removable disk memory, flash memory, and various combinations of these types of memory. The memory 148 is sometimes referred to as main memory and may in part be used as cache memory or buffer memory. The memory 148 stores various software packages, such as an operating system (OS) 150 and e-commerce software 152.

The e-commerce server 122 generally requests sensitive information from the client computer 102 to complete the business transaction. Sensitive information provided to the e-commerce server 122 may include but is not limited to the following: a user name, a password, an account name, credit card information, automatic teller machine (ATM) card information, a bank account number, a routing number, a personal identification number (PIN), and the like.

Figure 2:
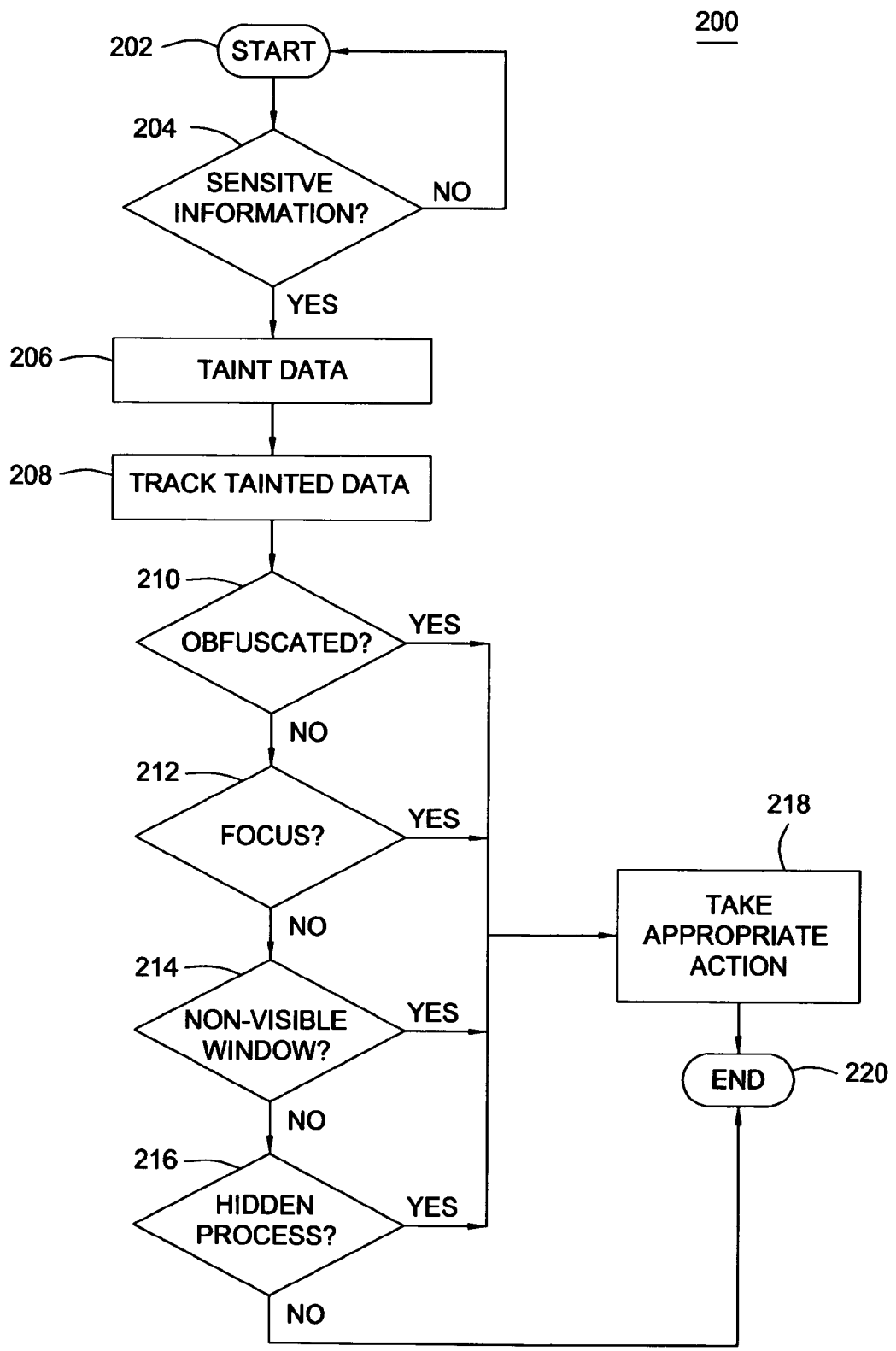
FIG. 2 is a flow diagram of a method for substantially preventing leakage of sensitive information from a computer system that utilizes one embodiment of the present invention.

FIG. 2 is a flow diagram of a method 200 for tracking tainted data through a client computer 102. In one embodiment of the invention, the method 200 assumes that application software 112 has been recompiled at application runtime by taint analysis software 114. By recompiling the application software 112, the present invention is capable of marking sensitive data as "tainted" through a well-known process known as dynamic instrumentation.

In another embodiment of the invention, taint analysis software 114 interacts with a taint processor 154 to monitor egress points of a computer system 102. The taint processor 154 performs taint analysis functions at the hardware level such as managing a shadow memory 164, tainting data within the shadow memory 164 and providing a taint status to software such as the taint analysis software 114. Because the tainting of data and management of the shadow memory 164 is directly performed at the hardware level, the taint analysis can be performed at a faster speed than a software implementation of taint analysis. The hardware implementation of taint analysis is also less susceptible to a computer virus than the software implementation. The taint analysis is also more reliable because the taint analysis software 114 can interact directly with the taint processor 154 via system calls to the operating system 110.

The method 200 starts at step 202 when sensitive data is detected.

Sensitive information comprises a username and a password, a credit card number, a routing number, a checking account number, a social security number, an account number and a personal identification (PIN) number. Sensitive information is generally any information known only to the user and an authorized recipient of the information selected by the user. Sensitive information may also be any information transmitted by the user over a secure website, e.g., a website with a URL address starting with https://, or any other secure means of communication.

Sensitive data may be identified by matching a character string to a known character string of sensitive data, e.g., a stored user name and password can be matched against an entered user name and password. Sensitive data may also be identified by matching a URL address against a list of known URL addresses that request sensitive data. For example, a financial institution's website may be on a list of known URL addresses and any information entered in a page corresponding to the financial institution's website will be identified as sensitive data. The present invention provides the benefit of securing sensitive data even when such a website does not employ a secure socket (https://) protocol. Sensitive data may also be identified by matching entered data to a known pattern of sensitive data. For example, a credit card number is a sixteen digit number that follows a pattern well known in the art. The present invention is capable of identifying entered data as sensitive data, i.e., a credit card number, by matching the entered data to this well known pattern. Other examples of sensitive data that match a well known pattern include social security numbers, checking account numbers and bank routing numbers. The present invention is capable of identifying sensitive information even if the taint analysis software 114 does not have previous knowledge of the number, i.e., the sensitive information was not previously stored or tainted by the taint analysis software 114.

The method 200 loops to step 202 if the data entered into the client computer 102 is not sensitive. If the data is sensitive, then the method 200 proceeds to step 206.

At step 206 the sensitive data is tainted. The data is tainted by storing taint bits in a "shadow" memory location associated with each "real" memory location. The shadow memory location, i.e., an address within the shadow memory 164, corresponds to another real memory location within the memory 108. As tainted data is operated upon and propagated throughout the real memory, the taint bits are propagated throughout the shadow memory 164. Thus, the taint bits stored in the shadow memory 164 indicate whether data stored in the corresponding real memory location is tainted or untainted.

The taint bits stored in the shadow memory 164 location identify the data stored in the real memory location as sensitive data. The taint bits may have values that also indicate a type of data, such as e-mail data, webpage data, text data, etc. By indicating the type of data the present invention can determine if the sensitive data is being legitimately accessed by a resource. For example, if sensitive data is typed into a text document, then the present invention can taint that particular data as the type "text" and the taint bits can also indicate that only an appropriate application such as MICROSOFT WORD should access data with the taint type "text". If an email application attempts to access data with the taint type "text" it may be an indication that a computer virus or trojan is attempting to transmit the sensitive data out of the client computer 102 to an unauthorized recipient.

The sensitive data is tainted by a well-known process known as dynamic instrumentation. Application software 112 is recompiled at application run-time by the taint analysis software 114. Recompilation of the application software 112 at application run-time ensures the taint analysis software 114 is capable of safeguarding sensitive data on the client computer 102 regardless of the application receiving or transmitting the sensitive data.

At step 208, the tainted data is tracked through the client computer 102. As discussed above, the taint bits stored in the shadow memory 164 location identify the data as sensitive data and may also indicate the type of data. The taint analysis software uses the taint bits in conjunction with a set of rules discussed below to determine if an unauthorized program or process, e.g., a trojan, is attempting to access the tainted data.

Decision steps 210, 212, 214 and 216 occur substantially simultaneously. In one embodiment of the invention, these steps occur only when system egress points, e.g., a network connection, file input/output (I/O), or registry access, are accessed. By performing these checks only when system egress points are accessed, the present invention does not impede system performance by monitoring the tainted data each time the tainted data is accessed. Further, these steps may occur in any order. An occurrence of any of the events indicated by steps 210 through 214 may be an indication that an unauthorized program or process is attempting to access tainted data. Such an occurrence causes the taint analysis software 114 to take an appropriate action at step 218. Appropriate actions may include blocking all outbound communication ports on the client, notifying a user that unauthorized access to tainted data has occurred, terminating the unauthorized program or process, quarantining the program or process that attempted to access or accessed the tainted data and initiating an anti-virus or anti-spyware program to scan for programs that may compromise the security of sensitive data.

At decision step 210 the taint analysis software determines if the tainted data has been obfuscated in any way. Data may be obfuscated by encrypting the data or transforming the data into another form. Obfuscation of sensitive data may also occur for a legitimate purpose. Thus, obfuscation of sensitive data is considered a weak indication that the data is being accessed by a malicious program or process. If the tainted data is obfuscated, then the method 200 proceeds to step 218. At step 218, the taint analysis software 114 takes an appropriate action as discussed above. If the data is not obfuscated, then the method 200 proceeds to step 212.

At decision step 212, the taint analysis software 114 determines if a program or process requesting access to the tainted data had focus of the data at the time of input. For example, if sensitive data is entered into a website, the data is tainted by the taint analysis software 114 with taint bits that mark the data as "web data" and the associated application, such as MICROSOFT INTERNET EXPLORER. If another application such as an email client, such as MICROSOFT OUTLOOK, attempts to access the sensitive data, the taint analysis software 114 can identify that the application did not have focus at the time sensitive data was first entered. An attempt by an application to access data that was not originally associated with that application may be an indication the application is attempting an unauthorized access of the data. If the program or process requesting access to the tainted data did have focus of the data at the time of input, then the process 200 proceeds to step 214. If the program or process requesting access to the tainted data did not have focus of the data at the time of input, then the process 200 proceeds to step 218. At step 218, the taint analysis software 114 takes an appropriate action as discussed above.

At decision step 214, the taint analysis software 114 determines if the program or process requesting the tainted data has a non-visible window. A non-visible window is a strong indication that such a program or process is malicious in nature. Trojan programs such as keystroke loggers typically use non-visible windows to hide their presence from a user. The taint analysis software 114 obtains a list of all processes running on the client computer 102 from the operating system 110. The taint analysis software 114 also obtains from the operating system 110 an indication as to whether the operating system 110 created a visible window for each process. If the program or process requesting the tainted data has a visible window, then the method 200 proceeds to step 216. If the program or process requesting the tainted data has a non-visible window, then the method 200 proceeds to step

218. At step 218, the taint analysis software 114 takes an appropriate action as discussed above.

At decision step 216, the taint analysis software determines if a hidden program or process is requesting access to the tainted data. A hidden process is a process not visible to a user on a process list, such as MICROSOFT WINDOWS TASK MANAGER, generated by the operating system 110. Hidden processes are utilized by viruses and trojan programs, allowing these programs to often run undetected by the user. The presence of a hidden process requesting access to tainted data is a strong indication that that the process is malicious in nature. If a hidden process requests access to tainted data, then the method 200 proceeds to step 218. At step 218, the taint analysis software 114 takes an appropriate action as discussed above. Otherwise, the method 200 proceeds to step 220. The method 200 ends at step 220.

The present invention is taint analysis software that safeguards sensitive data, such as a social security number, credit card information, etc., by monitoring the egress points of a computer system for leakage of the sensitive information. The taint analysis software employs a technique known as dynamic instrumentation that recompiles application software at run-time. The taint analysis software stores taint bits in a shadow memory 164 location and associates the taint bits with the sensitive data stored in a real memory location. From that point on, the data is tainted, i.e., identified by the taint bits in the shadow memory 164 location, and the taint analysis software can track the movement of the tainted data through a personal computer. The taint analysis software can also use the taint bits to determine whether an unauthorized program or process is trying to access the tainted data and whether there is an attempt to leak the tainted data from the computer. Upon detection of unauthorized access to the tainted data, the taint analysis software can initiate an appropriate action such as terminating the process that is accessing the tainted data or notifying the user of an attempt to compromise the tainted data.

In one embodiment, the method comprises a computer-readable medium having stored thereon a plurality of instructions. The plurality of instructions includes instructions which, when executed by a processor, cause the processor to perform a method. The method performed by the processor comprises identifying data entered into the computer system as sensitive data, tracking the sensitive data within the computer system, and identifying at least one condition that compromises the security of the tainted data.

While the foregoing is directed to embodiments of the present invention, other and further embodiments of the invention may be devised without departing from the basic scope thereof, and the scope thereof is determined by the claims that follow.

The invention claimed is:

1. A method for detecting leakage of sensitive information from a computer system comprising:
   identifying data entered into the computer system as sensitive data;
   tracking access to the sensitive data within the computer system, in the event the access is associated with a system egress point;
   identifying, in response to access associated with the system egress point, at least one condition that compromises the security of the sensitive data, wherein the at least one condition comprises access by an unauthorized process to sensitive data; and
   taking an appropriate action to protect the sensitive data in view of the at least one condition, wherein the appropriate action comprises at least one of terminating the application obfuscating the sensitive data, terminating the application that did not have focus of the sensitive data at time of input into the computer system that is processing the sensitive data, terminating the application with a non-visible window that is processing the sensitive data, terminating the hidden process that is processing the sensitive data, or blocking at least one communication port of the computer system.

2. The method of claim 1 wherein the tracking step further comprises tainting the sensitive data to facilitate tracking.

3. The method of claim 2 wherein said tainting step further comprises storing at least one taint bit in a shadow memory to identify the sensitive data as tainted data.

4. The method of claim 1 wherein the at least one condition that compromises the security of the tainted data comprises:
   access by an unauthorized application that attempts to transmit any subset of the sensitive data out of the computer system, obfuscation of the sensitive data by an application, an application that did not have focus of the sensitive data at time of input into the computer system is processing the sensitive data; and a hidden process is processing the sensitive data.

5. The method of claim 1 wherein sensitive information comprises at least one of a user name, a password, an account name, an account number, a checking account number, a savings account number, a credit card number, automatic teller machine (ATM) card information, a bank account number, a routing number, a personal identification number (PIN), a social security number, or any information entered into a secure socket website.

6. The method of claim 3 wherein the at least one taint bit associates the tainted data with at least one application software.

7. The method of claim 3 wherein the at least one taint bit associates the tainted data with at least one application software that had focus at time of data entry into the computer system.

8. The method of claim 3 wherein the at least one taint bit indicates a type of data.

9. The method of claim 1 wherein the step of identifying further comprises at least one of matching a character string to another character string of known sensitive data, or matching the entered data to a pattern of sensitive data.

10. A non-transitory computer-readable medium having stored thereon a plurality of instructions, the plurality of instructions including instructions which, when executed by a processor, cause the processor to perform a method comprising:
    identifying data entered into the computer system as sensitive data;
    tracking access to the sensitive data within the computer system, in the event the access is associated with a system egress point; and
    identifying, in response to access associated with the system egress point, at least one condition that compromises the security of the sensitive data, wherein the at least one condition comprises access by an unauthorized process to sensitive data; and
    taking an appropriate action to protect the sensitive data in view of the at least one condition, wherein the appropriate action comprises at least one of terminating the application obfuscating the sensitive data, terminating the application that did not have focus of the sensitive data at time of input into the computer system that is processing the sensitive data, terminating the application with a non-visible window that is processing the sensitive data, terminating the hidden process that is processing the sensitive data, or blocking at least one communication port of the computer system.

11. The non-transitory computer-readable medium of claim 10 wherein the method performed by the processor further comprises tainting the sensitive data to facilitate tracking.

12. The non-transitory computer-readable medium of claim 11 wherein the method performed by the processor further comprises storing at least one taint bit in a shadow memory to identify the sensitive data as tainted data.

13. The non-transitory computer-readable medium of claim 10 wherein the method performed by the processor further comprises identifying performed by the processes further comprises matching a character string to another character string of known sensitive data, matching a URL address to a known URL address for receiving sensitive data and matching the entered data to a pattern of sensitive data.

14. A system for preventing leakage of sensitive information from a computer system comprising:
a processor;
a memory storing taint analysis software; and
the taint analysis software configured to:
identify data entered into the computer system as sensitive data;
track access to the sensitive data within the computer system, in the event the access is associated with a system egress point;
identify, in response to access associated with the system egress point, at least one condition that compromises the security of the sensitive data, wherein the at least one condition comprises access by an unauthorized process to sensitive data; and
perform an appropriate action to protect the sensitive data in view of the at least one condition, wherein the appropriate action comprises at least one of: terminating the application obfuscating the sensitive data, terminating the application that did not have focus of the sensitive data at time of input into the computer system that is processing the sensitive data, terminating the application with a non-visible window that is processing the sensitive data, terminating the hidden process that is processing the sensitive data, or blocking at least one communication port of the computer system.

15. The system of claim 14 wherein the taint analysis software taints the sensitive data to form tainted data and to facilitate tracking.

16. The system of claim 14 further comprising a taint processor for tainting the sensitive data in response to a request from the taint analysis software.

17. The system of claim 16 wherein the taint processor provides a taint status in response to a second request from the taint analysis software.

18. The system of claim 17 wherein the taint processor manages a shadow memory within the memory to store the at least one taint bit.

19. The system of claim 17, wherein identifying data entered into the computer system as sensitive data comprises determining that the entered data matches a pattern of sensitive financial data.

20. The method of claim 1, wherein the at least one condition that compromises the security of the tainted data comprises an application with a nonvisible window is processing the sensitive data.

21. The method of claim 1, wherein identifying further comprises matching a URL address to a known URL address for receiving sensitive data.

* * * * *